Jan. 3, 1961 C. T. ISLEY, JR 2,967,020
ELECTRICAL COMPUTERS
Filed May 21, 1956 2 Sheets-Sheet 1
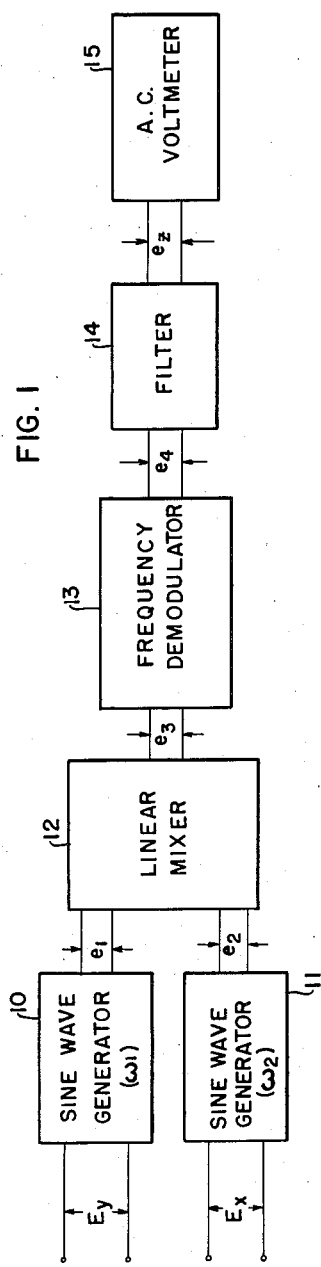
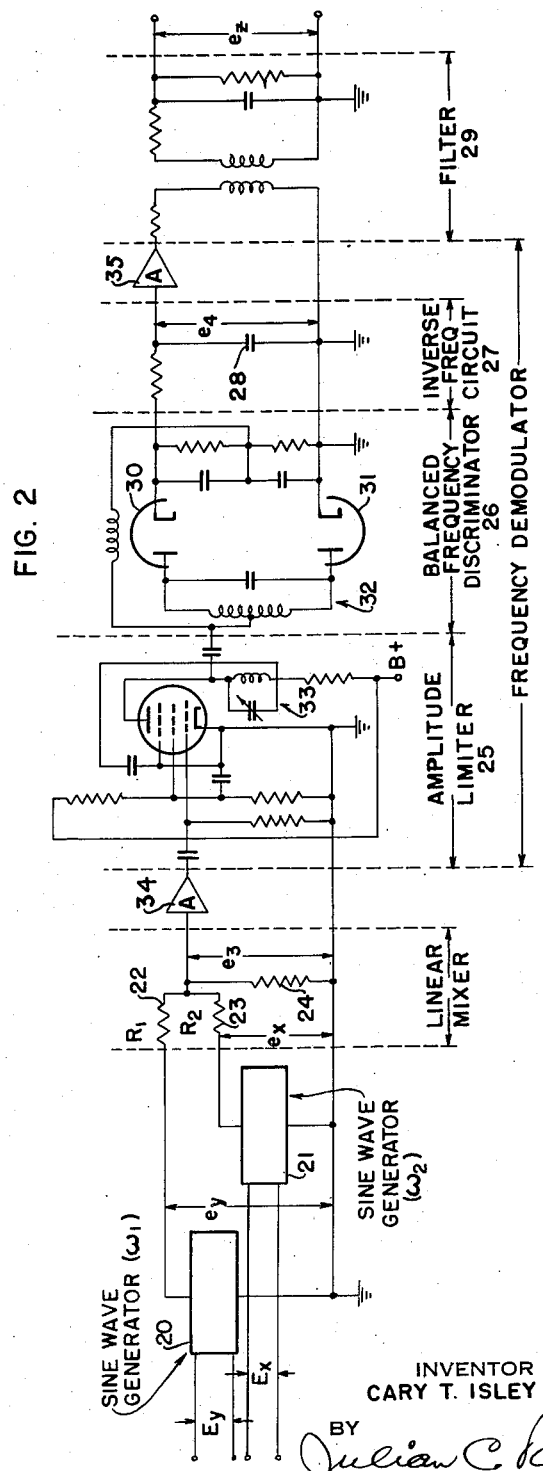
INVENTOR
CARY T. ISLEY JR.
BY
Julian C. Renfro
ATTORNEY Jan. 3, 1961  C. T. ISLEY, JR  2,967,020
ELECTRICAL COMPUTERS
Filed May 21, 1956  2 Sheets-Sheet 2

INVENTOR
CARY T. ISLEY JR.
BY
*Julian C. Renfro*
ATTORNEY

United States Patent Office 2,967,020
Patented Jan. 3, 1961

2,967,020

ELECTRICAL COMPUTERS

Cary T. Isley, Jr., Los Angeles County, Calif., assignor to The Martin Company, a corporation of Maryland Filed May 21, 1956, Ser. No. 586,112

6 Claims. (Cl. 235—193)

The present invention relates to electrical computers and more particularly to an electrical computer for deriving from a pair of voltages having amplitudes proportional to preselected numerical dividend and divisor quantities, a resultant voltage having an amplitude proportional to the quotient quantity raised to a desired numerical integer power.

The object of the invention is to provide a simplified computer capable of solving the equation $E_z \propto (E_2/E_1)^b$, where $E_1$, $E_2$ and $E_z$ are voltage quantities, $E_1$ and $E_2$ having preselected values, and $b$ is a numerical integer quantity.

Electrical computing devices capable of deriving a voltage representative of the quotient of preselected numerical quantities raised to a power are known. The utility of most of these devices however is limited by the complexity and inaccuracy of the component circuits heretofore required.

The present invention provides a system for deriving a voltage of this nature wherein relatively simple and highly accurate electrical circuits are employed to produce a resultant voltage with an accuracy better than 0.1%.

Further the present invention provides a system and circuits wherein the power represented by the resultant voltage may have a preselected numerical integer value.

To this end the circuits of this invention are arranged to simultaneously produce an infinite series of frequency distinguishable voltages, each voltage being representative of the quotient of preselected numerical dividend and divisor quantities raised to a numerical integer power, which power may have a numerical value from one to infinity in successive integer steps. Selection of a desired numerical power may therefore be simply effected by filtering means tuned to select a particular frequency voltage of the series. This manner of numerical power selection is especially advantageous in that it does not require alteration of the parameters of the computing circuitry and therefore avoids the errors which would otherwise be introduced.

These and other advantages of the present invention will now be described in detail in conjunction with the accompanying drawings, in whcih:

Fig. 1 is a block diagram substantially illustrating an electrical computer embodying the invention;

Fig. 2 is a detailed circuit diagram of the electrical computer of Fig. 1;

Figure 3:
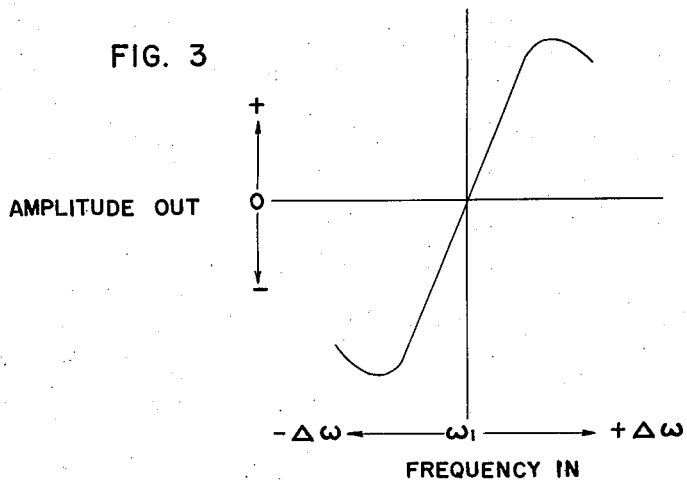
Fig. 3 is a graph of the frequency in-amplitude out characteristic of the balanced frequency discriminator illustrated in Fig. 2.

Assume that the solution to the equation $z=(x/y)^b$ is desired, of which $x$ and $y$ are preselected numerical quantities, $y$ being larger than $x$, and $b$ is a numerical positive integer quantity. Assume also that the quantities $x$ and $y$ are represented by the proportional amplitudes of two voltages $E_x$ and $E_y$ respectively. In accordance with the invention the solution of the subject equation is effected in the following manner:

First, a pair of different frequency sinusoidal voltages are produced with amplitudes respectively proportional to the amplitudes of voltages $E_x$ and $E_y$. These sinusoidal voltages may therefore be characterized by the equations:

(1) $\qquad e_1 = E_1 \sin \omega_1 t$ and (2) $\qquad e_2 = E_2 \sin \omega_2 t$ where $E_1$ is proportional to $E_y$, $E_2$ is proportional to $E_x$ and $\omega_1$ differs from $\omega_2$.

Second, the voltages $e_1$ and $e_2$ are added algebraically. The voltage $e_3$ resulting from this addition is expressed by the equation:

(3) $\qquad e_3 \propto E_1\sqrt{1+k^2+2k \cos \mu t}$ $$\sin\left(\omega_1 t + \tan^{-1}\left[\frac{k \sin \mu t}{1+k \cos \mu t}\right]\right)$$

where:

$k = E_2/E_1 < 1$ and
$\mu = \omega_2 - \omega_1$

As evidenced by Equation 3, the amplitude of the voltage $e_3$ varies in time with the frequency $\mu = \omega_2 - \omega_1$.

Third, by converting the frequency variations of voltage $e_3$ into linearly proportional voltage amplitude variations. The resulting voltage $e_4$ is expressed by the equation:

(4) $\qquad e_4 \propto E_4 \dfrac{d}{dt}\left[\omega_1 t + \tan^{-1}\left(\dfrac{k \sin \mu t}{1+k \cos \mu t}\right)\right]$ Differentiation and expansion of Equation 4 result in equations:

(5) $\qquad e_4 \propto \mu E_4 \sum_{1}^{\infty} k^m \cos m\mu t$ or, (6) $\qquad e_4 \propto \mu E_4 [k \cos \mu t + k^2 \cos 2\mu t$
$\qquad\qquad + k^3 \cos 3\mu t + \ldots$
$\qquad\qquad + k^\infty \cos \infty \mu t]$ As shown by Equations 5 and 6 voltage $e_4$ is composed of an infinite series of component sinusoidal voltages having a fundamental voltage and harmonic voltages which latter progress in frequency in successive numerical integer multiples of the frequency of the fundamental voltage. Since $k$ is equal to $E_2/E_1$ (refer to Equation 3) Equations 5 and 6 also indicate that the amplitude of each of the voltages is proportional to the quotient of $E_2$ divided by $E_1$ raised to a power the numerical value of which power corresponds to the frequency multiple represented by the voltage.

Fourth, by filter selection from voltage $e_4$, that component sinusoidal voltage is obtained having a frequency equal to the product of the numerical value of the integer $b$ multiplied by the frequency of the fundamental voltage. In accordance with Equation 6 the voltage having this frequency is expressed by the equation:

(7) $\qquad e_z \propto (E_2/E_1)^b \cos[b(\omega_2 t - \omega_1 t)]$

The amplitude $E_z$ of voltage $e_z$ is therefore proportional to $(E_2/E_1)^b$ or, since voltages $E_2$ and $E_1$ are proportional to $x$ and $y$ respectively, to $(x/y)^b$. Voltage $e_z$ therefore represents the solution $z$ to the subject equation.

In Fig. 1 an electrical computer unit adapted to operate in the manner just described and in accordance with the invention is illustrated schematically in block diagram form. The computer comprises a pair of electrical circuit sinusoidal voltage sources, generators 10 and 11, an electrical linear mixer circuit 12, an electrical frequency demodulator circuit 13, an electrical filter 14, and an A.C. voltmeter 15, all electrically coupled in the order named.

In solving the equation $z=(x/y)^b$, voltages $E_x$ and $E_y$ are applied to generators 10 and 11 which operates to produce the sinusoidal voltages $e_1$ and $e_2$. Voltages $e_1$ and $e_2$ are applied by electrical circuit means to the input of linear mixer 12 which algebraically adds the voltages thereby producing at its output, the voltage $e_3$.

Frequency demodulator circuit 13 converts frequency variations of its input voltage into linearly proportional amplitude variations of voltage at its output. Voltage $e_3$ applied to the input of the frequency demodulator circuit thus produces at its output, the voltage $e_4$.

Filter 14 is tuned to pass to its output a sinusoidal voltage of a predetermined frequency characterized by the product of the numerical value of the integer $b$ multiplied by the frequency of the fundamental of voltage $e_4$. Voltage $e_4$ therefore when applied to the filter circuit results in the selection of the voltage $e_z$ therefrom, and the development of that voltage at the output of the filter circuit. Thus output voltage $e_z$ represents the solution to the equation and is applied to an A.C. voltmeter 15 to be measured thereby.

The computer unit of this invention may, however, be integrated with conventional computing units to perform more complex computations, in which case voltage $e_z$ may be employed as an input signal to a succeeding unit.

It is characteristic of the operation described that of the sinusoidal voltages added in mixer 12, that voltage having the larger amplitude will always represent the divisor, and that voltage having the smaller amplitude will always represent the dividend of the quotient represented by the output voltage $e_z$. For simplicity of explanation it has been assumed that $y$ was larger than $x$, and therefore that voltage $E_1$ was larger than voltage $E_2$. If, however $y$ is actually smaller than $x$, it is only necessary to proportion the amplitudes of voltages $E_x$ and $E_y$ by known scale factors so that the amplitude $E_1$ of voltage $e_1$ is larger than the amplitude $E_2$ of voltage $e_2$ before adding the voltages in mixer 12.

The following explanation with reference to Fig. 2 describes this proportioning function in further detail. The electronic computer illustrated in Fig. 2 is divided into functional sections analogous to the component blocks of Fig. 1. Sine wave generators 20 and 21 are again illustrated in block diagram form. In practice, information indicating the values of the numerical quantities to be divided will often be in the form of D.C. signals produced by other computer units. In that event the sinusoidal voltages representative of these quantities may be produced by mechanical switch modulators which in combination with filter networks will convert the D.C. input signals to the proper sinusoidal frequencies. But a requirement of the mechanical switch modulator is that its duty cycle shall be as nearly constant as possible so that the fundamental component of the square wave produced thereby remains sinusoidal.

Assume, again, that the solution to the equation $z=(x/y)^b$ is desired, but that $y$ is now smaller than $x$ and that sine wave generators 20 and 21 are of the switch modulator type. The sinusoidal voltages $e_x$ and $e_y$ produced by the generators 20 and 21 will then have amplitudes equal to $E_x$ and $E_y$. As already indicated, in order to divide $x$ by $y$, it is necessary that the amplitude of the sinusoidal voltage representing $y$ be larger than the amplitude of the sinusoidal voltage representing $x$. For this reason voltages $e_x$ and $e_y$ are introduced into amplitude proportioning circuitry comprising resistors 22, 23 and 24. The values of the resistors are selected so that the portion of voltage $E_y$ appearing across resistor 24 is larger than the portion of voltage $E_x$ appearing across resistor 24. Since the values of the resistors are known quantities, the amplitudes $E_x$ and $E_y$ are proportioned by known scale factors, and therefore the output voltage of the computer may readily be adjusted to compensate for the proportionment effected by the resistor combination.

Evidently proportionment of either voltage $E_x$ or $E_y$ alone will suffice to produce the desired result. However, for clarity in the specification and the appended claims the voltages resulting from the proportioning step will be denoted by the symbols $E_1$ and $E_2$, it being understood that these voltages might have resulted from proportioning either voltages $E_x$ or $E_y$ by a unity scale factor.

The amplitude proportioning circuitry therefore produces from sinusoidal voltages $e_y$ and $e_x$, a sinusoidal voltage, $e_1 = E_1 \sin \omega_1 t$, representing $y$, and a sinusoidal voltage, $e_2 = E_2 \sin \omega_2 t$, representing $x$, where $E_1$ is larger than $E_2$. The combination of resistors 22, 23 and 24 also serve to algebraically add voltages $e_1$ and $e_2$ across resistor 24 to produce the voltage $e_3$ which, as has already been indicated, is characterized by an instantaneous frequency and an amplitude which vary with time.

Voltage $e_3$ is introduced through isolating amplifier 34 into a frequency demodulator circuit comprising an amplitude limiter 25, a balanced frequency discriminator 26, and an inverse frequency circuit 27. The component electrical circuits of the frequency demodulator are conventional in operation and a detailed description of the same may be found in any elementary text on the subject of frequency modulation. In Ultra-High Frequency Techniques by Brainerd, Koehler, Reich and Woodruff (Van Nostrand Company 1942), chapter 8 entitled Radio Receivers, page 282, a diagram of a circuit employing a limiter and a discriminator in an organization quite similar to the present are shown and described. Similarly, in Electronics and Electron Devices by Arthur L. Albert (Macmillan Company 1956), chapter 13, section 13–13, a discriminator is shown and described at length on page 466.

Amplitude limiter 25 operates to remove the amplitude variations of voltage $e_3$ so that the voltage introduced into balanced frequency discriminator 26 is maintained at a constant level. The output of the amplitude limiter is developed across tank circuit 33 and is both inductively and capacitatively coupled into frequency discriminator 26.

The waveform of the output from the amplitude limiter is no longer capable of being represented by Equation 3, which can be rewritten as follows:

(3a) $A_1 \sin \omega_1 t + A_2 \sin \omega_2 t =$
[$A \sin (\omega_1 t - \omega_2 t) + B \sin (\omega_1 t + \omega_2 t) + C \sin \omega_1 t$]

Rather, three infinite series would be required to represent the waveform, and each step or term of the infinite series increases the frequency by an integer multiple, and changes the amplitude by a power of the multiple. Therefore, in order to calculate the voltage existing at capacitor 36, approximately 40 or 50 terms of the expansion would be required for a fair approximation.

Balanced frequency discriminator 26 operates to convert frequency variations of its input voltage into linearly proportional amplitude variations of voltage at its output. The frequency in-amplitude out characteristic of frequency discriminator 26 is illustrated in Fig. 3. It will be noted that the characteristic of the balanced frequency discriminator is centered at $\omega_1$, the frequency of $e_1$, the voltage representing the divisor. The discriminator is so designed because the instantaneous frequency of voltage $e_3$ will vary almost equally to either side of the frequency of the larger amplitude voltage added in the linear mixer. Therefore, centering the frequency discriminator at $\omega_1$ helps to insure that the instantaneous frequency of voltage $e_3$ will remain within the linear portion of the discriminator's characteristic.

The output of balanced frequency discriminator 26 is applied to an inverse frequency circuit 27 which is designed to compensate for the effects of frequency instability in the balanced frequency discriminator. The inverse frequency circuit comprises a simple resistor-capacitor circuit designed to develop its input voltages across capacitor 28 with their amplitudes adjusted in inverse proportion to their respective frequencies.

The output of inverse frequency circuit 27 is applied through isolating amplifier 35 to filter 29. Filter 29 comprises a conventional bandpass filter which is tuned to pass only a sinusoidal voltage having a frequency equal to the product of the numerical value of the integer $b$ multiplied by the frequency of the fundamental of voltage $e_4$. The output of filter 29 will therefore be voltage $e_z$ having an amplitude $E_z$ proportional to $(E_2/E_2)^b$.

The accuracy of computation in the computer of Fig. 2 is largely dependent upon the linearity of the balanced frequency discriminator 26. A balanced frequency discriminator, however, enjoys virtual freedom from even harmonic distortion and any residual odd order distortion can be held to less than 0.1% even in systems where the frequency deviation $\Delta\omega$ to either side of the center frequency $\omega_1$ (as illustrated in Fig. 3) is a sizable percentage of the center frequency $\omega_1$. For smaller frequency deviations the 0.1% figure could probably be considerably bettered. The diode detectors 30 and 31 associated with the frequency sensitive inductor-capacitor tank circuit 32 of the balanced frequency discriminator introduce some distortion. Due to the balanced arrangement, however, distortion in the detectors is virtually all odd order and may be kept extremely low for high signal levels into the discriminator (30–50 v.); low effective modulation percentages (20% to 30%); and high diode load impedance. For example, for even a simple half wave diode detector, it has been experimentally observed that, with a 10-volt carrier and 20% modulation, distortion in the demodulated output is less than 0.2%. From the foregoing it is seen why the relatively simple and high speed computer of this invention is capable of effecting non-linear mathematical operations to an accuracy of better than 0.1%.

Figure 4:
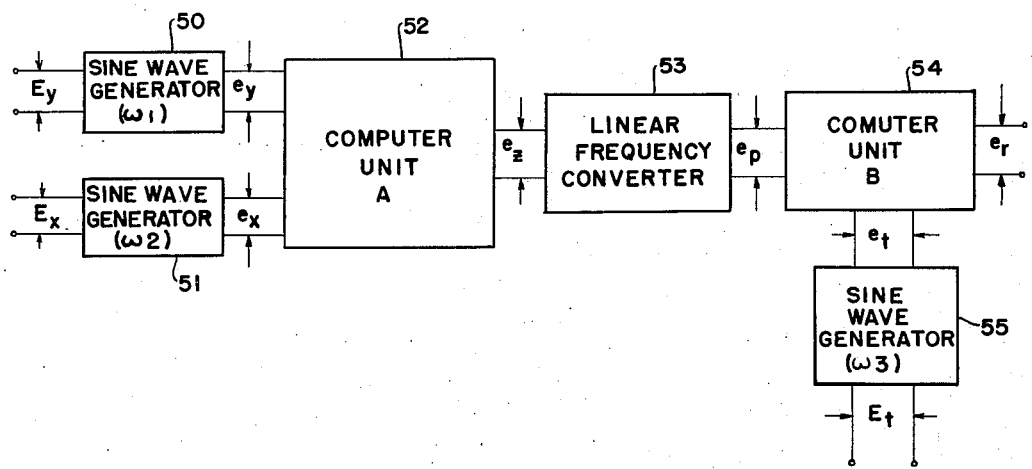
Fig. 4 is a block diagram of a pair of electrical computer units of this invention operating in tandem.

An electrical computer unit of this invention is capable of performing the mathematical operations of division, raising a number to a power and raising a ratio to a power. It is possible by tandem operation of such basic units to increase the variety of performable operations. A block diagram representing such a tandem operation is illustrated in Fig. 4. Each computer unit block in the diagram represents the combination of a linear mixer 12, a frequency demodulator 13, and a filter 14 as illustrated in Fig. 1.

Assume it is desired to solve the equation $$r = t^c (y/x)^{b+c}$$

where $t$, $x$, and $y$ are preselected numerical quantities, $b$ and $c$ are any desired numerical integer quantities, and $y$ is larger than $x$. The input voltages $e_y$ and $e_x$ out of sine wave generators 50 and 51, respectively, are introduced into computer unit A, 52, tuned to the power $b$. The output voltage $e_z'$ of computer unit A is therefore proportional to $(x/y)^b$. Neglecting linear frequency converter 53 for the moment, voltage $e_p$ introduced into computer unit B, 54, will be equal to voltage $e_z$. The third numerical quantity, $t$, is introduced into the computer system by means of sine wave generator 55 which produces voltage $e_t$. Voltages $e_t$ and $o_p$ are introduced directly into computer unit B which is tuned to the power $c$. Assuming, again for simplicity, that the amplitude of voltage $e_p$ is larger than the amplitude of voltage $e_t$, the output voltage $e_r$ of computer unit B is proportional to $t^c \div (x/y)^{b+c}$ or $t^c (y/x)^{b+c}$. Tandem computer unit operation therefore extends the computing scope of the present invention to include such non-linear operations as multiplication, multiplication-division, etc.

As shown by Equation 7 in the above derivation, the frequency of the output voltage $e_z$ of a computer unit of this invention is equal to the difference between the input signal frequencies, $\omega_2 - \omega_1$, multiplied by the numerical value of the integer $b$. Evidently in tandem operation the frequencies of the output voltages will continue to decrease from unit to unit, thereby retarding computing speed. High speed operation may be maintained, however, by introducing a linear frequency converter 53 between units, the converter being adapted to heterodyne the voltage frequency out of a preceding computer unit to a higher frequency before introducing the voltage to a following computer unit.

Preferred embodiments of the invention have been described. Various changes and modifications however may be made within the scope of the invention as set forth in the appended claims.

Where the terms "linear mixer," "amplitude limiter," "balanced frequency discriminator," "bandpass filter," and "inverse frequency circuit" are employed in the appended claims, they are intended to include within their meaning, in addition to the circuitry thus described in Fig. 3, all circuits which are substantially equivalent thereto.

I claim:

1. An electrical computer for solving the equation $E_z \propto (E_2/E_1)^b$, where $E_1$, $E_2$ and $E_z$ are voltage quantities, $E_1$ and $E_2$ having preselected values such that $E_1$ is larger than $E_2$, and $b$ is a numerical integer quantity, comprising electrical circuit sinusoidal voltage sources for producing a pair of different frequency voltages $e_1$ and $e_2$, which said voltages are characterized by the equations, $e_1 = E_1 \sin \omega_1 t$ and $e_2 = E_2 \sin \omega_2 t$, electrical circuit means for algebraically adding the said voltages $e_1$ and $e_2$ to produce a voltage $e_3$ the frequency of which varies with time, frequency demodulating electrical circuit means for converting frequency variations of its input voltage into linearly proportional amplitude variations of voltage at its output, electrical circuit means for applying said voltage $e_3$ to the input of said frequency demodulating circuit means, electrical circuit means including said frequency demodulating circuit means for developing at its output a voltage $e_4$ which is composed of an infinite series of component sinusoidal voltages having a fundamental voltage and harmonic voltages, which latter voltages progress in frequency in successive numerical integer multiples of the frequency of the said fundamental voltage as expressed by the equation, $$e_4 \propto (E_2/E_1) \cos (\omega_2 t - \omega_1 t)(E_2/E_1)^2$$
$$\cos 2(\omega_2 t - \omega_1 t) + E_2/E_1)^3$$
$$\cos 3(\omega_2 t - \omega_1 t) \ldots (E_2/E_1)^\infty \cos\infty(\omega_2 t - \omega_1 t)$$

an output circuit, electrical circuit filter means tuned to pass to said output circuit a sinusoidal voltage of a predetermined frequency characterized by the product of the numerical value of the integer $b$ multiplied by the frequency of the said fundamental voltage, electrical circuit means for applying the voltage $e_4$ to the input of said filter circuit means, electrical circuit means including said filter circuit means for selecting from said voltage $e_4$ a component sinusoidal voltage $e_z$ characterized by the equation, $e_z \infty (E_2/E_1)^b \cos b(\omega_2 t - \omega_1 t)$, and electrical circuit means for developing said voltage $e_z$ at the said output circuit.

2. In combination, in an electrical computer for solving the equation $E_z \infty (E_2/E_1)^b$, where $E_1$, $E_2$ and $E_z$ are voltage quantities, $E_1$ and $E_2$ being preselected amplitudes of different frequency sinusoidal voltages $e_1$ and $e_2$, such that $E_1$ is larger than $E_2$, and $b$ is a numerical integer quantity, an electrical frequency demodulator circuit for converting frequency variations of a voltage representing the algebraic sum of voltages $e_1$ and $e_2$ into voltage amplitude variations linearly proportional to the said frequency variations, said circuit having means for developing a modulated wave form expressible as an infinite series, and a tuned circuit for selecting a desired term from said infinite series for use as a computer term.

3. An electrical computer comprising a linear summing network for algebraically summing sinusoidal input voltages, an electrical frequency demodulator circuit having its input coupled to the output of said linear summing network, and a bandpass filter circuit having its input coupled to the output of said frequency demodulator circuit for selecting a component whose frequency is related to the difference frequency between said input voltages.

4. An electrical computer comprising an electrical linear summing network for algebraically summing sinusoidal input voltages, an electrical amplitude limiter circuit having its input coupled to the output of said linear summing network, an electrical balanced frequency discriminator circuit having its input coupled to the output of said amplitude limiter circuit, and a bandpass filter circuit having its input coupled to the output of said frequency discriminator circuit for selecting a harmonic component of the output of said frequency discriminator, the frequency of said harmonic component being related to the frequency of one of said sinusoidal input voltages.

5. An electrical computer comprising an electrical linear mixer circuit, an electrical amplitude limiter circuit having its input coupled to the output of said linear mixer circuit, an electrical balanced frequency discriminator circuit having its input coupled to the output of said amplitude linear circuit, an electrical inverse frequency circuit having its input coupled to the output of said balanced frequency discriminator circuit, and a bandpass filter circuit having its input coupled to the output of said inverse frequency circuit.

6. An electrical computer for solving the equation $E_z \propto (E_x/E_y)^b$, of which $E_x$, $E_y$ and $E_z$ are voltage quantities, $E_x$ and $E_y$ having preselected values, and $b$ is a numerical integer quantity, comprising electrical circuit voltage sources of the said voltage $E_x$ and $E_y$, amplitude proportioning electrical circuit means for proportioning the said voltages $E_y$ and $E_x$ by known scale factors to produce voltages $E_1$ and $E_2$ respectively, of which voltage $E_1$ is larger than voltage $E_2$, electrical circuit sinusoidal voltage sources including said amplitude proportioning means for producing a pair of different frequency sinusoidal voltages $e_1$ and $e_2$, which said voltages are characterized by the equations $e_1=E_1 \sin \omega_1 t$ and $e_2=E_2 \sin \omega_2 t$, electrical circuit means for algebraically adding the said voltages $e_1$ and $e_2$ to produce a voltage $e_3$ the frequency of which varies with time, frequency demodulating electrical circuit means for converting frequency variations of its input voltage into linearly proportional amplitude variations of voltage at its output, electrical circuit means for applying said voltage $e_3$ to the input of said frequency demodulating circuit means, electrical circuit means including said frequency demodulating circuit means for developing at its output a voltage $e_4$ which is composed of an infinite series of component sinusoidal voltages having a fundamental voltage and harmonic voltages, which latter voltages progress in frequency in successive numerical integer multiples of the frequency of the said fundamental voltage as expressed by the equation, $$e_4 \propto (E_2/E_1) \cos(\omega_2 t - \omega_1 t) + (E_2/E_1)^2 \cos 2(\omega_2 t - \omega_1 t) + (E_2/E_1)^3 \cos 3(\omega_2 t - \omega_1 t) \ldots (E_2/E_1)^\infty \cos \infty (\omega_2 t - \omega_1 t)$$

an output circuit, electrical circuit filter means tuned to pass to said output circuit a sinusoidal voltage of a predetermined frequency characterized by the product of the numerical value of the integer $b$ multiplied by the frequency of the said fundamental voltage, electrical circuit means for applying the voltage $e_4$ to the input of said filter circuit means, electrical circuit means including said filter circuit means for selecting from said voltage $e_4$ a component sinusoidal voltage $e_z$ characterized by the equation, $e_z \propto (E_2/E_1)^b \cos b(\omega_2 t - \omega_1 t)$, and electrical circuit means for developing said voltage $e_z$ at the said output circuit.

References Cited in the file of this patent
UNITED STATES PATENTS

| | | |
|---|---|---|
| 2,233,183 | Roder | Feb. 25, 1941 |
| 2,476,162 | Thompson | July 12, 1949 |